(12) United States Patent
Ekman et al.

(10) Patent No.: US 11,743,697 B2
(45) Date of Patent: Aug. 29, 2023

(54) CONTEXT BASED INTERACTION BETWEEN A VEHICLE AND AN ENTITY DEVICE

(71) Applicant: Volvo Car Corporation, Gothenburg (SE)

(72) Inventors: Klas Ekman, Gothenburg (SE); Stian Skolemestra, Gothenburg (SE)

(73) Assignee: VOLVO CAR CORPORATION, Gothenburg (SE)

( * ) Notice: Subject to any disclaimer, the term of this patent is extended or adjusted under 35 U.S.C. 154(b) by 63 days.

(21) Appl. No.: 17/465,720

(22) Filed: Sep. 2, 2021

(65) Prior Publication Data

US 2022/0070635 A1    Mar. 3, 2022

Related U.S. Application Data

(60) Provisional application No. 63/074,180, filed on Sep. 3, 2020.

(51) Int. Cl.
| | | |
|---|---|---|
| *H04W 4/40* | (2018.01) | |
| *H04W 4/02* | (2018.01) | |
| *H04W 4/021* | (2018.01) | |
| *H04W 64/00* | (2009.01) | |

(52) U.S. Cl.
CPC .............. *H04W 4/40* (2018.02); *H04W 4/021* (2013.01); *H04W 4/025* (2013.01); *H04W 64/006* (2013.01)

(58) Field of Classification Search
None
See application file for complete search history.

(56) References Cited

U.S. PATENT DOCUMENTS

| | | | | |
|---|---|---|---|---|
| 2013/0196612 | A1* | 8/2013 | Cepuran | G08B 21/025 455/404.1 |
| 2015/0355703 | A1* | 12/2015 | Macdonald | G06F 1/3206 701/36 |
| 2018/0334138 | A1* | 11/2018 | Namineni | G06F 1/3231 |

\* cited by examiner

*Primary Examiner* — Thomas S McCormack
(74) *Attorney, Agent, or Firm* — Amin, Turocy & Watson, LLP

(57) ABSTRACT

Systems, computer-implemented methods, and computer program products to facilitate context based interaction between a vehicle and an entity device are provided. According to an embodiment, a system can comprise a memory that stores computer executable components and a processor that executes the computer executable components stored in the memory. The computer executable components can comprise a context component that identifies a context condition corresponding to a vehicle or an entity device communicatively coupled to the vehicle. The computer executable components can further comprise a message component that sends a context based message to the entity device based on the context condition. The computer executable components can further comprise a control component that initiates an operation associated with the vehicle based on an instruction input to the entity device in response to the context based message.

20 Claims, 9 Drawing Sheets

CONTEXT BASED INTERACTION BETWEEN A VEHICLE AND AN ENTITY DEVICE

CROSS-REFERENCE TO RELATED APPLICATIONS

This application claims the benefit of priority to U.S. Provisional Application No. 63/074,180, filed Sep. 3, 2020, entitled "CONTEXT BASED INTERACTION BETWEEN A VEHICLE AND AN ENTITY DEVICE." The entirety of the aforementioned application is hereby incorporated herein by reference.

BACKGROUND

The subject disclosure relates to interaction between a vehicle and an entity, and more specifically, to context based interaction between a vehicle and an entity device.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate context based interaction between a vehicle and an entity device are described.

According to an embodiment, a system can comprise a memory that stores computer executable components and a processor that executes the computer executable components stored in the memory. The computer executable components can comprise a context component that identifies a context condition corresponding to a vehicle or an entity device communicatively coupled to the vehicle. The computer executable components can further comprise a message component that sends a context based message to the entity device based on the context condition. The computer executable components can further comprise a control component that initiates an operation associated with the vehicle based on an instruction input to the entity device in response to the context based message.

According to another embodiment, a computer-implemented method can comprise identifying, by a system operatively coupled to a processor, a context condition corresponding to a vehicle or an entity device communicatively coupled to the vehicle. The computer-implemented method can further comprise sending, by the system, a context based message to the entity device based on the context condition. The computer-implemented method can further comprise initiating, by the system, an operation associated with the vehicle based on an instruction input to the entity device in response to the context based message.

According to another embodiment, a computer program product facilitating a context based interaction process between a vehicle and an entity device is provided. The computer program product comprising a computer readable storage medium having program instructions embodied therewith, the program instructions executable by a processor to cause the processor to identify, by the processor, a context condition corresponding to a vehicle or an entity device communicatively coupled to the vehicle. The program instructions are further executable by the processor to cause the processor to send, by the processor, a context based message to the entity device based on the context condition. The program instructions are further executable by the processor to cause the processor to initiate, by the processor, an operation associated with the vehicle based on an instruction input to the entity device in response to the context based message.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It will be understood that when an element is referred to as being "coupled" to another element, it can describe one or more different types of coupling including, but not limited to, chemical coupling, communicative coupling, capacitive coupling, electrical coupling, electromagnetic coupling, inductive coupling, operative coupling, optical coupling, physical coupling, thermal coupling, and/or another type of coupling. As referenced herein, an "entity" can comprise a human, a client, a user, a computing device, a software application, an agent, a machine learning model, an artificial intelligence, and/or another entity. It should be appreciated that such an entity can facilitate implementation of the subject disclosure in accordance with one or more embodiments the described herein.

Figure 1:
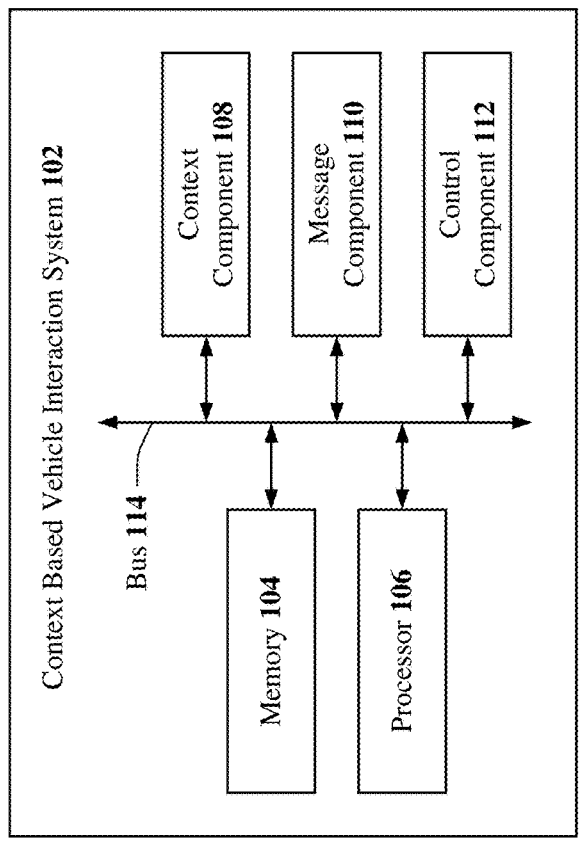
FIGS. 1 and 2 illustrate block diagrams of example, non-limiting systems that can facilitate context based interaction between a vehicle and an entity device in accordance with one or more embodiments described herein.

FIG. 1 illustrates a block diagram of an example, non-limiting system 100 that can facilitate context based interaction between a vehicle and an entity device in accordance with one or more embodiments described herein. System 100 can comprise a context based vehicle interaction system 102. Context based vehicle interaction system 102 can comprise a memory 104, a processor 106, a context component 108, a message component 110, a control component 112, and/or a bus 114.

Context based vehicle interaction system 102 can comprise any type of system, device, machine, apparatus, component, and/or instrument that comprises a processor and/or that can communicate with one or more local or remote electronic systems and/or one or more local or remote devices via a wired and/or wireless network. All such embodiments are envisioned. For example, context based vehicle interaction system 102 can comprise a computing device, a general-purpose computer, a special-purpose computer, an onboard computing device, a communication device, an onboard communication device, a server device, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, context based vehicle interaction system 102 can be implemented in an onboard computing and/or communication system that can be located in a vehicle. In these embodiments, context based vehicle interaction system 102 can be coupled (e.g., communicatively, electrically, operatively, optically, etc.) to one or more electronic control units (ECU) in the vehicle and/or to one or more remote devices (e.g., remote computing and/or communication devices such as, for instance, a smart phone, a smart watch, wireless earbuds, etc.). For example, context based vehicle interaction system 102 can be implemented in an onboard computing and/or communication system located in a vehicle and coupled to one or more electronic control units in the vehicle to facilitate various operations of such electronic control unit(s) based on one or more commands (e.g., instruction(s)) provided to context based vehicle interaction system 102 via such one or more remote devices. For instance, context based vehicle interaction system 102 can facilitate one or more power functions of one or more vehicle components based on commands provided to context based vehicle interaction system 102 via such one or more remote devices. As described in detail below, in accordance with one or more embodiments of the subject disclosure, based on commands provided to context based vehicle interaction system 102 via such one or more remote devices, context based vehicle interaction system 102 can facilitate one or more power functions of one or more vehicle components including, but not limited to: engine(s); motor(s); transmission(s); door(s); lid(s); lock(s); window(s); tailgate(s); boot lid(s); hood(s); sunroof(s); heating, ventilation, and air conditioning (HVAC) system(s); entertainment system(s); navigational system(s); and/or another vehicle component. In some embodiments, context based vehicle interaction system 102 can be implemented in one or more of such remote devices (e.g., in a smart phone, smart watch, smart earbuds, etc.).

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to context based vehicle interaction system 102, context component 108, message component 110, control component 112, and/or another component associated with context based vehicle interaction system 102 (e.g., artificial intelligence component 202, etc.) as described herein with or without reference to the various figures of the subject disclosure. Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor.

Context based vehicle interaction system 102, memory 104, processor 106, context component 108, message component 110, control component 112, and/or another component of context based vehicle interaction system 102 as described herein (e.g., artificial intelligence component 202, etc.) can be communicatively, electrically, operatively, and/or optically coupled to one another via a bus 114 to perform functions of system 100, context based vehicle interaction system 102, and/or any components coupled therewith. Bus 114 can comprise one or more memory bus, memory controller, peripheral bus, external bus, local bus, a quantum bus, and/or another type of bus that can employ various bus architectures (e.g., industrial standard architecture (ISA), extended ISA (EISA), micro-channel architecture (MSA), intelligent drive electronics (IDE), advanced graphics port (AGP), VESA local bus (VLB), peripheral component interconnect (PCI), universal serial bus (USB), card bus, small computer systems interface (SCSI), firewire (IEEE 1394), etc.).

Context based vehicle interaction system 102 can be coupled (e.g., communicatively, electrically, operatively, optically, etc.) to one or more local or remote (e.g., external) systems, sources, and/or devices (e.g., electronic control systems (ECU), classical and/or quantum computing devices, communication devices, etc.). For example, context based vehicle interaction system 102 can be coupled (e.g., communicatively, electrically, operatively, optically, etc.) to one or more local or remote (e.g., external) systems, sources, and/or devices using a data cable (e.g., High-Definition Multimedia Interface (HDMI), recommended standard (RS) 232, Ethernet cable, etc.) and/or one or more wired networks described below.

In some embodiments, context based vehicle interaction system 102 can be coupled (e.g., communicatively, electrically, operatively, optically, etc.) to one or more local or remote (e.g., external) systems, sources, and/or devices (e.g., electronic control units (ECU), classical and/or quantum computing devices, communication devices, etc.) via a network. In these embodiments, such a network can comprise one or more wired and/or wireless networks, including, but not limited to, a cellular network, a wide area network (WAN) (e.g., the Internet), and/or a local area network (LAN). For example, context based vehicle interaction system 102 can communicate with one or more local or remote (e.g., external) systems, sources, and/or devices, for instance, computing devices using such a network, which can comprise virtually any desired wired or wireless technology, including but not limited to: powerline ethernet, wireless fidelity (Wi-Fi), BLUETOOTH®, fiber optic communications, global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In this example, context based vehicle interaction system 102 can thus include hardware (e.g., a central processing unit (CPU), a transceiver, a decoder, an antenna (e.g., a ultra-wideband (UWB) antenna, a BLUETOOTH® low energy (BLE) antenna, etc.), quantum hardware, a quantum processor, etc.), software (e.g., a set of threads, a set of processes, software in execution, quantum pulse schedule, quantum circuit, quantum gates, etc.), or a combination of hardware and software that facilitates communicating information between context based vehicle interaction system 102 and remote (e.g., external) systems, sources, and/or devices (e.g., computing and/or communication devices such as, for instance, a smart phone, a smart watch, wireless earbuds, etc.).

Context based vehicle interaction system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with context based vehicle interaction system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, context component 108, message component 110, control component 112, and/or any other components associated with context based vehicle interaction system 102 (e.g., artificial intelligence component 202, etc.) as disclosed herein (e.g., communicatively, electronically, operatively, and/or optically coupled with and/or employed by context based vehicle interaction system 102), can comprise such computer and/or machine readable, writable, and/or executable component(s) and/or instruction(s). Consequently, according to numerous embodiments, context based vehicle interaction system 102 and/or any components associated therewith as disclosed herein, can employ processor 106 to execute such computer and/or machine readable, writable, and/or executable component(s) and/or instruction(s) to facilitate performance of one or more operations described herein with reference to context based vehicle interaction system 102 and/or any such components associated therewith.

It is to be appreciated that the context-based vehicle interaction system 102 can utilize any of a variety of devices (e.g., global positioning system (GPS) device(s), smart watches, mobile telephones; wearable devices . . . ), systems (e.g., machine vision, wireless triangulation, voice recognition, proximity determination, facial recognition, other vehicles, on-board computers, weather determination . . . ), historical information (e.g., behavioral patterns, preferences . . . ) in order to determine or infer context of a user or users in order to facilitate taking automated action or prompting a user for confirmation prior to taking automated action. It is to be appreciated that the confirmation of user intent or preference regarding an automated action can be implemented in a variety of ways, e.g., sending a message to a smart watch, mobile phone, other wearable; sending an audible inquiry through a speaker (e.g., watch speaker, headphones, mobile device, car speaker . . . ) to determine whether or not to take automated action. Artificial-intelligence or machine learning systems and techniques can be employed to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or context based vehicle interaction system 102 can further comprise various computer and/or computing-based elements including, but not limited to, one or more: basic input/output system (BIOS); removable or non-removable, volatile or non-volatile computer storage media (e.g., a disk storage, magnetic disk drive, memory stick, flash memory card, etc.); removable or non-removable interface; operating system; system applications; program modules; program data; input devices (e.g., a touch screen, touch pad, microphone, digital video camera, digital camera, keyboard, etc.); output devices (e.g., monitor, screen, speakers, etc.); interface ports (e.g., a serial port, parallel port, game port, universal serial bus (USB), etc.); output adapter (e.g., video card, sound card, etc.); network interface (e.g., one or more wire and/or wireless communication networks described above such as, for instance, LAN, WAN, cellular networks, etc.); communication connections (e.g., ISDN adapters, Ethernet cards, modems, etc.); and/or other computer and/or computing-based elements. In several embodiments, such computer and/or computing-based elements can be used in connection with implementing one or more of the systems, devices, components, and/or computer-implemented operations shown and described in connection with FIG. 1 or other figures disclosed herein.

Context based vehicle interaction system 102 can facilitate (e.g., via processor 106) performance of operations executed by and/or associated with context component 108, message component 110, control component 112, and/or another component associated with context based vehicle interaction system 102 as disclosed herein (e.g., artificial intelligence component 202, etc.). For example, as described in detail below, context based vehicle interaction system 102 can facilitate via processor 106 (e.g., a classical processor, a quantum processor, etc.): identifying a context condition corresponding to a vehicle or an entity device communicatively coupled to the vehicle; sending a context based message to the entity device based on the context condition; and/or initiating an operation associated with the vehicle based on an instruction input to the entity device in response to the context based message.

In another example, as described in detail below, context based vehicle interaction system 102 can further facilitate via processor 106 (e.g., a classical processor, a quantum processor, etc.): learning to identify one or more context conditions corresponding to the vehicle or the entity device; learning to send one or more context based messages to the entity device based on the one or more context conditions; learning to initiate one or more operations associated with the vehicle based on at least one of instructions input to the entity device in response to the one or more context based messages or omissions of instructions input to the entity device in response to the one or more context based messages; and/or initiating the operation based on a defined level of confidence determined based on at least one of instructions input to the entity device in response to context based messages or omissions of instructions input to the entity device in response to the context based messages.

In the examples above: at least one of the context condition, the vehicle, the entity device, the context based message, the operation, or the instruction can be defined by an entity; the context condition can be selected from a group consisting of a locked vehicle component, an unlocked vehicle component, an open vehicle component, a closed vehicle component, a powered on vehicle component, a powered off vehicle component, the entity device is within a defined proximity of the vehicle, the entity device is outside a defined proximity of the vehicle, and at least one of the vehicle or the entity device is located at a defined location; the context based message can be selected from a group consisting of a push message, a passive message, an interactive message, a textual message, a numerical message, an alphanumeric message, an audio message, a video message, and a pictogram message; and/or the instruction can be selected from a group consisting of an active instruction to initiate the operation, a passive instruction to initiate the operation, a textual instruction, a numerical instruction, an alphanumeric instruction, an audio instruction, a video instruction, a pictogram instruction, and a defined instruction corresponding to a defined motion of the entity device.

Context component 108 can identify a context condition corresponding to a vehicle or an entity device communicatively coupled to the vehicle. For example, context component 108 can identify a context condition corresponding to a vehicle such as, for instance, an automobile (e.g., car, truck, sport utility vehicle (SUV), a semi-truck, recreational vehicle (RV), etc.), a motorcycle, a boat, a plane, a train, and/or another vehicle. In this example, context component 108 can identify a context condition corresponding to an entity device communicatively coupled (e.g., wirelessly over a network) to such a vehicle defined above, where such an entity device can include, but is not limited to, a portable computing and/or communication device, a smart phone, a smart wearable device, a smart watch, smart earbud(s), smart glasses, and/or another entity device. Such an entity device defined above can be associated with (e.g., owned by, worn by, used by, etc.) one or more entities that can operate the vehicle (e.g., a driver, a passenger, etc.).

Context component 108 can identify a context condition including, but not limited to: a locked or unlocked vehicle component (e.g., a locked or unlocked: door, lid, tailgate, boot lid, hood, sunroof, window, etc.); an open or closed vehicle component (e.g., an open or closed: door, lid, tailgate, boot lid, hood, sunroof, window, etc.); a powered on or powered off vehicle component (e.g., a powered on or powered off: engine, motor, HVAC system, entertainment system, navigational system, etc.); and/or another context condition such as, for instance, context conditions described below.

Context component 108 can identify a context condition that indicates that the entity device is within or outside of a defined proximity of the vehicle. For example, context component 108 can use various wireless technologies and/or wireless communication protocols to detect that the entity device is within or outside of a defined radius from the vehicle (e.g., 1 meter, 5 meters, etc.). For instance, context component 108 can use spatial awareness technology such as, for example, BLUETOOTH® technology (e.g., a BLUETOOTH® low energy (BLE) antenna located in the vehicle and/or in the entity device) and/or ultra-wideband (UWB) technology (e.g., a UWB antenna located in the vehicle and/or in the entity device) to detect that the entity device is within or outside of a defined radius from the vehicle.

Context component 108 can identify a context condition that indicates that the vehicle and/or the entity device is located at or approximately at a defined location. For example, context component 108 can detect that the vehicle and/or the entity device is located at or approximately at a defined location including, but not limited to, a grocery store, an appliance store, a hardware store, a park, a playground, a campground, a parking lot, and/or another location. In this example, context component 108 can use various wireless technologies and/or wireless communication protocols to detect that the vehicle and/or the entity device is located at or approximately at a defined location. For instance, context component 108 can use a global positioning system (GPS) located in the vehicle and/or in the entity device to detect that the vehicle and/or the entity device is located at or approximately at a defined location. In another example, context component 108 can use spatial awareness technology such as, for example, BLE technology (e.g., a BLE antenna located in the vehicle and/or in the entity device) and/or UWB technology (e.g., a UWB antenna located in the vehicle and/or in the entity device) to detect that the vehicle and/or the entity device is located at or approximately at a defined location.

In some embodiments, the context condition, the vehicle, and/or the entity device described above can be defined by an entity such as, for instance, an entity as defined herein that can be associated with the vehicle and/or the entity device (e.g., the owner, operator, user, driver, and/or passenger of the vehicle and/or the entity device). For example, although not depicted in the figures, context based vehicle interaction system 102 can comprise an interface component including, but not limited to, a graphical user interface (GUI), an application programming interface (API), a representational state transfer (REST) API, and/or another interface component. In this example, such an interface component of context based vehicle interaction system 102 can be accessed by such an entity via, for instance, a display (e.g., a touch screen, touch pad, etc.) coupled to an onboard computing and/or communication system located in the vehicle and/or a screen (e.g., a touch screen, touch pad, etc.) on the entity device. In these examples, such an entity can use such an interface component of context based vehicle interaction system 102 to define, for instance: one or more context conditions that the entity wants identified by context component 108; a certain vehicle that context based vehicle interaction system 102 is to be implemented in and/or interact with; and/or one or more entity devices that context based vehicle interaction system 102 is to implemented in and/or interact with (e.g., one or more smart devices (e.g., smart phone, smart watch, etc.) of the entity or of another entity that can operate and/or otherwise use the vehicle).

Message component 110 can send a context based message to an entity device based on a context condition. For example, based on identification by context component 108 of one or more of the context conditions defined above, message component 110 can send a context based message to one or more of the entity devices defined above. For instance, based on identification by context component 108 of one or more context conditions defined above, message component 110 can send a context based message including, but not limited to: a push message; a passive message; an interactive message (e.g., an interactive component comprising the context based message that can be rendered on a screen of a smart phone); a textual message; a numerical message; an alphanumeric message; an audio message (e.g., an audio message provided to the entity via a speaker coupled to a smart phone, etc.); a video message (e.g., a video message provided to the entity via a screen of a smart phone), a pictogram message (e.g., a message comprising a pictogram, a pictograph, an icon, etc.), and/or another type of context based message. Message component 110 can send such a context based message to one or more of the entity devices defined above using one or more of the wired and/or wireless networks and/or communication protocols defined above.

In some embodiments, the context based message described above can be defined by an entity such as, for instance, an entity as defined herein that can be associated with the vehicle and/or the entity device (e.g., the owner, operator, user, driver, and/or passenger of the vehicle and/or the entity device). For example, such an entity can use an interface component (e.g., a GUI, API, REST API, etc.) of context based vehicle interaction system 102 as described above to define one or more attributes of such a context based message. For instance, such an entity can define one or more attributes of such a context based message including, but not limited to, the type (e.g., passive, interactive, etc.), the content (e.g., recommended action, informational message, etc.), the format (e.g., push message, audio message, etc.), and/or another attribute of the context based message.

In some embodiments, based on receipt by the entity device of such a context based message, an entity as defined herein that can be associated with the entity device (e.g., the owner and/or user of the entity device, etc.) can ignore the context based message or provide a response (e.g., via a GUI rendered on a screen of a smart phone, smart watch, etc.). For example, the entity can provide a response to the context based message in the form of an instruction (e.g., a command) that, when executed, can initiate one or more operations associated with the vehicle. For instance, in an embodiment where context component 108 detects that a certain entity device is within a defined radius from the vehicle (e.g., 1 meter, 5 meters, etc.), message component 110 can send to the entity device an interactive context based message in the form of a recommended action such as, for example, "Open Tailgate." In this example embodiment, the entity associated with the entity device can provide a response to such an interactive context based message by selecting the interactive context based message comprising the recommended action "Open Tailgate" (e.g., by selecting an interactive GUI object comprising the context based message "Open Tailgate" that can be rendered on a screen of a smart phone, a smart watch, etc.). In this example embodiment, such a response to the interactive context based message can constitute an instruction that can be provided to control component 112 as described below to initiate an operation associated with the vehicle based on the response.

Control component 112 can initiate an operation associated with a vehicle based on an instruction input to an entity device in response to a context based message. For example, based on the above described entity selection of the interactive context based message "Open Tailgate," control component 112 can initiate the "Open Tailgate" operation. In some embodiments, control component 112 can initiate the "Open Tailgate" operation by providing such an instruction to an electronic control unit (ECU) in the vehicle that can perform the "Open Tailgate" operation. In these embodiments, as described above, context based vehicle interaction system 102 can be implemented in and/or coupled to an onboard computing and/or communication system in the vehicle, where such an onboard computing and/or communication system can be coupled to one or more electronic control units in the vehicle. Therefore, in these embodiments, control component 112 can initiate the "Open Tailgate" operation by providing the instruction directly to an ECU in the vehicle that can perform the "Open Tailgate" operation and/or by providing the instruction indirectly to such an ECU via such an onboard computing and/or communication system described above that can be located in the vehicle.

In the above described example embodiments, the instruction can include, but is not limited to: an active instruction to initiate the operation (e.g., where selection by an entity of an interactive context based message as described above constitutes an active instruction to initiate the operation); a passive instruction to initiate the operation (e.g., where an omission by an entity to respond to a context based message constitutes a passive instruction to initiate the operation); a textual instruction; a numerical instruction; an alphanumeric instruction; an audio instruction (e.g., a voice command sent by the entity via a microphone coupled to a smart phone, etc.); a video instruction (e.g., a video command sent by the entity via a camera coupled to a smart phone); a pictogram instruction (e.g., an instruction comprising a pictogram, a pictograph, an icon, etc.); a defined instruction corresponding to a defined motion of the entity device (e.g., where an entity can move the entity device in a predefined pattern (e.g., up and down, in circles, etc.) that can correspond to a certain predefined instruction); and/or another instruction.

In the above described example embodiments, the instruction and/or operation can be defined by an entity such as, for instance, an entity as defined herein that can be associated with the vehicle and/or the entity device (e.g., the owner, operator, user, driver, and/or passenger of the vehicle and/or the entity device). For example, such an entity can use an interface component (e.g., a GUI, API, REST API, etc.) of context based vehicle interaction system 102 as described above to define one or more attributes of such an instruction or operation. For instance, such an entity can define one or more attributes of such an instruction including, but not limited to, the type (e.g., passive, interactive, etc.), the content (e.g., initiate a certain operation, standby, etc.), the format (e.g., audio instruction, pictogram instruction, etc.), and/or another attribute of the instruction. In another example, such an entity can define one or more operations and/or further correlate them with one or more of the instructions defined above such that upon receipt of a certain instruction(s), control component 112 can initiate a certain operation(s) as described above.

Figure 2:
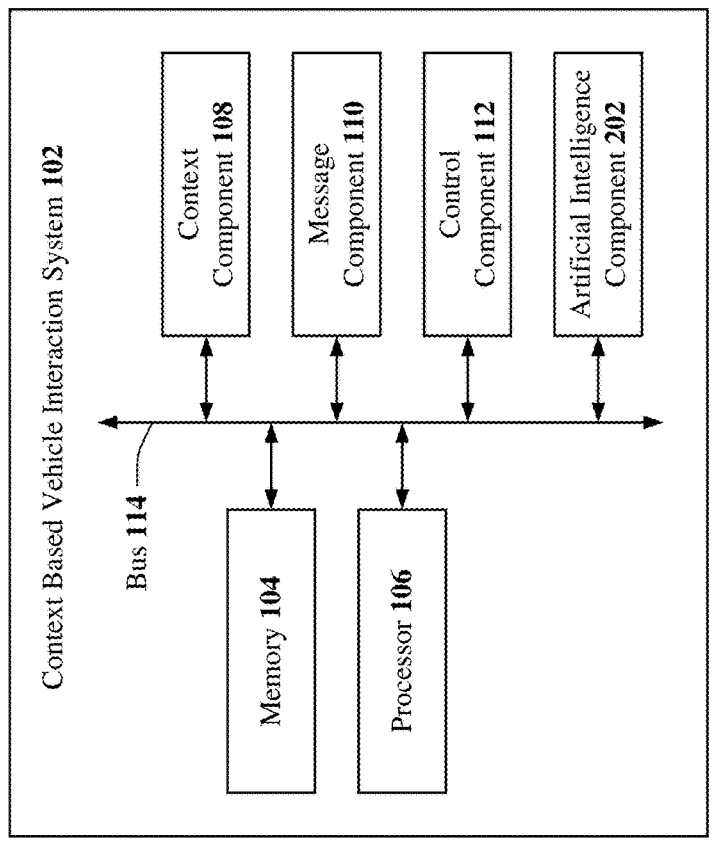

FIG. 2 illustrates a block diagram of an example, non-limiting system 200 that can facilitate context based interaction between a vehicle and an entity device in accordance with one or more embodiments described herein. System 200 can comprise context based vehicle interaction system 102, which can further comprise an artificial intelligence component 202. Repetitive description of like elements and/or processes employed in respective embodiments is omitted for sake of brevity.

Artificial intelligence component 202 can learn to: identify one or more context conditions corresponding to a vehicle or an entity device; send one or more context based messages to the entity device based on the one or more context conditions; and/or initiate one or more operations associated with the vehicle based on instructions input to the entity device in response to the one or more context based messages and/or omissions of instructions input to the entity device in response to the one or more context based messages. For example, artificial intelligence component 202 can comprise and/or employ an artificial intelligence (AI) model and/or a machine learning (ML) model that can learn to perform the above described functions as described below (e.g., via training using historical training data and/or feedback data).

In some embodiments, artificial intelligence component 202 can comprise an AI and/or ML model that can be trained (e.g., via supervised and/or unsupervised techniques) to perform the above described functions using historical training data comprising various context conditions that correspond to various context based messages, instructions, and/or operations. In this example, such an AI and/or ML model can further learn (e.g., via supervised and/or unsupervised techniques) to perform the above described functions using training data comprising feedback data from the entity described above that can be associated with the vehicle and/or the entity device, where such feedback data can be collected and/or stored (e.g., in memory 104) by artificial intelligence component 202. In this example, such feedback data can comprise the various instructions described above that can be input to the entity device over time in response to context based messages sent based on identification of different context conditions. In this example, such feedback data can also comprise the absence of instructions input to the entity device in response to context based messages (e.g., when the above described entity that can be associated with the vehicle and/or the entity device ignores context based messages and/or neglects to input instructions into the entity device in response to such context based messages). In some embodiments, based on learning to perform the functions described above, artificial intelligence component 202 can perform such functions in the same manner and/or using the same resources as that of context component 108, message component 110, and/or control component 112 described above with reference to FIG. 1.

Artificial intelligence component 202 can initiate an operation associated with a vehicle based on a defined level of confidence determined based on instructions input to an entity device in response to context based messages and/or omissions of instructions input to the entity device in response to the context based messages. For example, based on learning to perform such functions described above using the above defined feedback data, artificial intelligence component 202 can initiate an operation associated with the vehicle if it determines, based on such feedback data, that there is a relatively high level of confidence that the above described entity that can be associated with the vehicle and/or the entity device would want such an operation initiated. For instance, based on learning to perform such functions described above using the above defined feedback data, artificial intelligence component 202 can initiate an "Open Tailgate" operation when it identifies that the entity device is within a defined radius of the vehicle and/or is approaching the vehicle at a certain angle and/or speed. In some embodiments, such an entity that can be associated with the vehicle and/or the entity device can use an interface component of context based vehicle interaction system 102 as described above with reference to FIG. 1 to define the level of confidence that can be used by artificial intelligence component 202 to determine whether to initiate a certain operation associated with the vehicle or not.

In an embodiment, artificial intelligence component 202 can perform a utility-based analysis that factors cost of initiating the above described operation associated with the vehicle versus benefit. For example, in some instances, although the entity device can be located within such a defined radius of the vehicle and/or can approach the vehicle at a certain angle and/or speed, the entity associated with the vehicle and/or the entity device may not want the "Open Tailgate" operation initiated. In this embodiment, artificial intelligence component 202 can use one or more additional context conditions to determine the probability that the above described entity would want the "Open Tailgate" operation initiated. For example, artificial intelligence component 202 can use one or more additional context conditions such as, for instance, the location of the vehicle and/or the entity device (e.g., at home, at work, at an appliance store, etc.), the day of the week, the time of day, and/or another context condition to determine the probability that the above described entity would want the "Open Tailgate" operation initiated. In this example, artificial intelligence component 202 can weigh the probability that the entity would want the "Open Tailgate" operation initiated and/or the benefits of initiating such an operation against the probability that the entity would not want the "Open Tailgate" operation initiated and/or the costs (e.g., risks) of initiating such an operation.

In various embodiments, based on learning to initiate an operation associated with a vehicle, artificial intelligence component 202 can initiate such an operation in the same manner and/or using the same resources as that of control component 112 described above with reference to FIG. 1. For example, upon receipt from the entity device of an input instruction to perform an "Open Tailgate" operation as described above, artificial intelligence component 202 can initiate the operation by providing the instruction directly to an ECU in the vehicle that can perform the "Open Tailgate" operation and/or by providing the instruction indirectly to such an ECU via an onboard computing and/or communication system that can be located in the vehicle as described above with reference to FIG. 1.

To facilitate the above described functions (e.g., learning to identify context conditions, send context based messages, and initiate operations associated with a vehicle (e.g., based on a defined level of confidence)), artificial intelligence component 202 can perform classifications, correlations, inferences, and/or expressions associated with principles of artificial intelligence. For instance, artificial intelligence component 202 can employ an automatic classification system and/or an automatic classification. In one example, artificial intelligence component 202 can employ a probabilistic and/or statistical-based analysis (e.g., factoring into the analysis utilities and costs) to learn and/or generate inferences. Artificial intelligence component 202 can employ any suitable machine-learning based techniques, statistical-based techniques and/or probabilistic-based techniques. For example, artificial intelligence component 202 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, artificial intelligence component 202 can perform a set of machine learning computations. For instance, artificial intelligence component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 3:
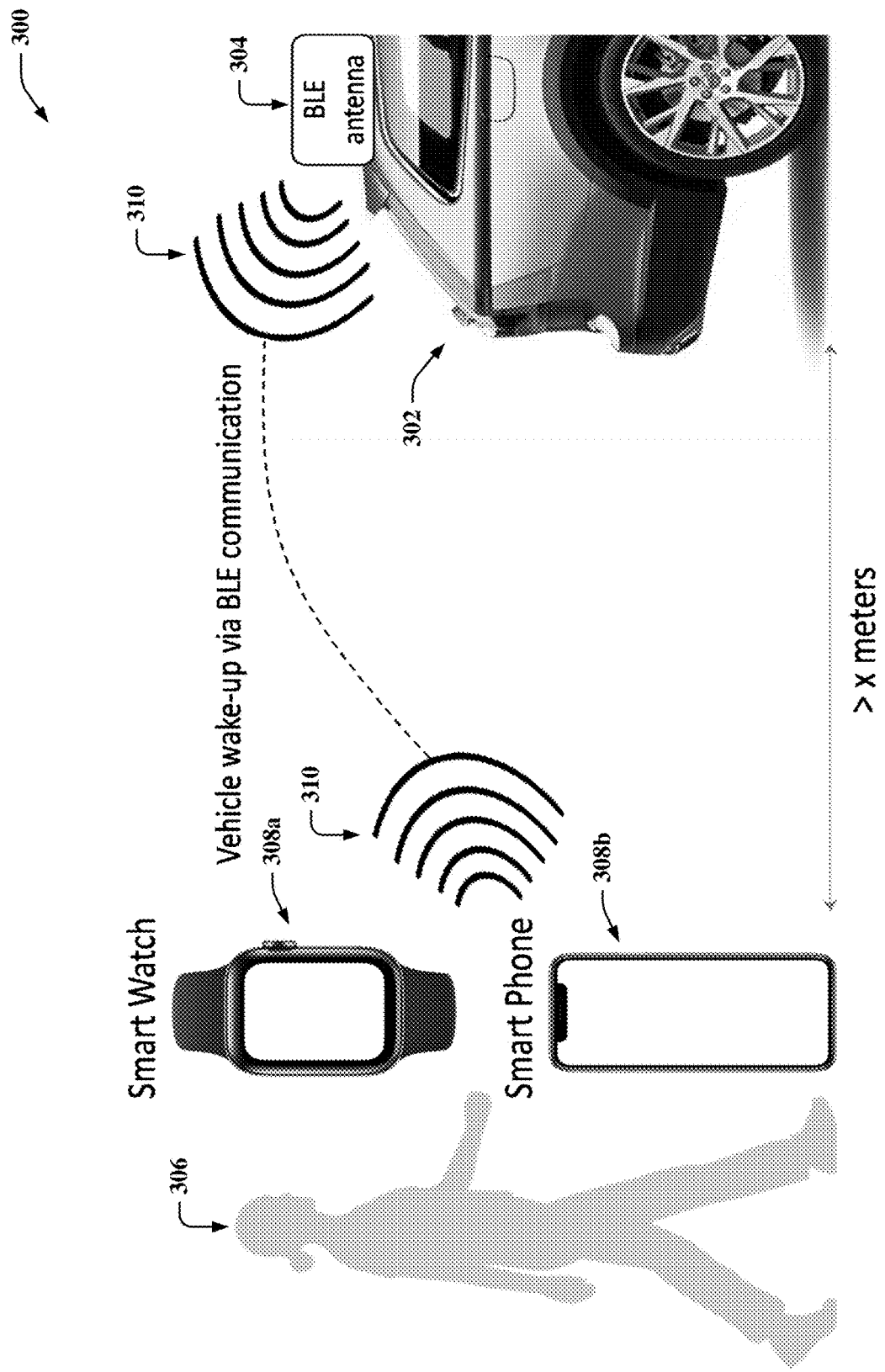
FIGS. 3, 4A, 4B, 5, 6, 7, and 8 illustrate diagrams of example, non-limiting systems that can facilitate context based interaction between a vehicle and an entity device in accordance with one or more embodiments described herein.

FIG. 3 illustrates a diagram of an example, non-limiting system 300 that can facilitate context based interaction between a vehicle and an entity device in accordance with one or more embodiments described herein. Repetitive description of like elements and/or processes employed in respective embodiments is omitted for sake of brevity.

System 300 can comprise a vehicle 302 that can comprise a BLUETOOTH® low energy (BLE) antenna 304 (referred to herein as "BLE antenna 304"). Vehicle 302 can further comprise context based vehicle interaction system 102 (not illustrated in FIG. 3). Vehicle 302 can comprise the same structure and/or functionality as that of the vehicle described above with reference to FIGS. 1 and 2.

System 300 can further comprise an entity 306 that can be associated with vehicle 302 and/or one or more entity devices 308a, 308b (e.g., entity 306 can be the owner, operator, user, driver, and/or passenger of vehicle 302 and/or entity devices 308a, 308b). Entity 306 can be the entity described above with reference to FIGS. 1 and 2 that can be associated with a vehicle (e.g., vehicle 302) and/or an entity device (e.g., entity device 308a and/or entity device 308b). Although not illustrated in FIG. 3, entity 306 can wear and/or otherwise possess entity device 308a and/or entity device 308b. For example, in embodiments where entity device 308a comprises a smart watch (e.g., as illustrated in FIG. 3), entity 306 can wear entity device 308a, for instance, on a wrist and/or forearm of entity 306. In another example, in embodiments where entity device 308b comprises a smart phone (e.g., as illustrated in FIG. 3), entity 306 can hold and/or stow entity device 308b, for instance, in a hand of entity 306 or in a pocket of clothing on entity 306, respectively.

As illustrated in the example embodiment depicted in FIG. 3, entity device 308a can comprise a smart watch and/or entity device 308b can comprise a smart phone. In some embodiments, entity device 308a and/or entity device 308b can comprise context based vehicle interaction system 102 (not illustrated in FIG. 3). In this example embodiment, entity device 308a and/or entity device 308b can be communicatively coupled to vehicle 302 via, for instance, BLE technology and/or communication protocol, BLE antenna 304, and/or a network 310 that can comprise one or more of wireless networks described above with reference to FIG. 1.

In some embodiments, entity device 308a and entity device 308b can be communicatively coupled to each other (not illustrated in FIG. 3) via, for instance, BLE technology and/or communication protocol, a BLE antenna on each of entity device 308a and entity device 308b, and/or network 310. In the example embodiment illustrated in FIG. 3, when context component 108 detects entity device 308a and/or entity device 308b within a predefined radius from vehicle 302 (e.g., within "x meters" as denoted in FIG. 3), vehicle 302, context based vehicle interaction system 102, entity device 308a, and/or entity device 308b can wake-up via BLE communication as depicted in FIG. 3.

Figure 4A:
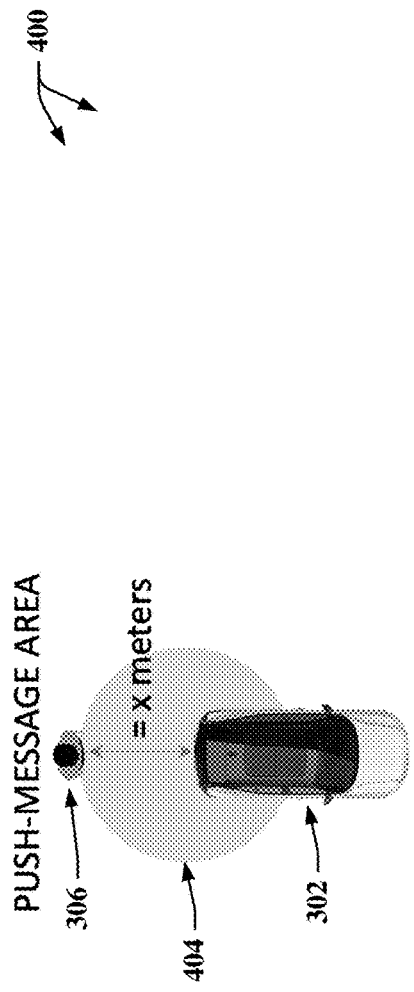
Figure 4B:
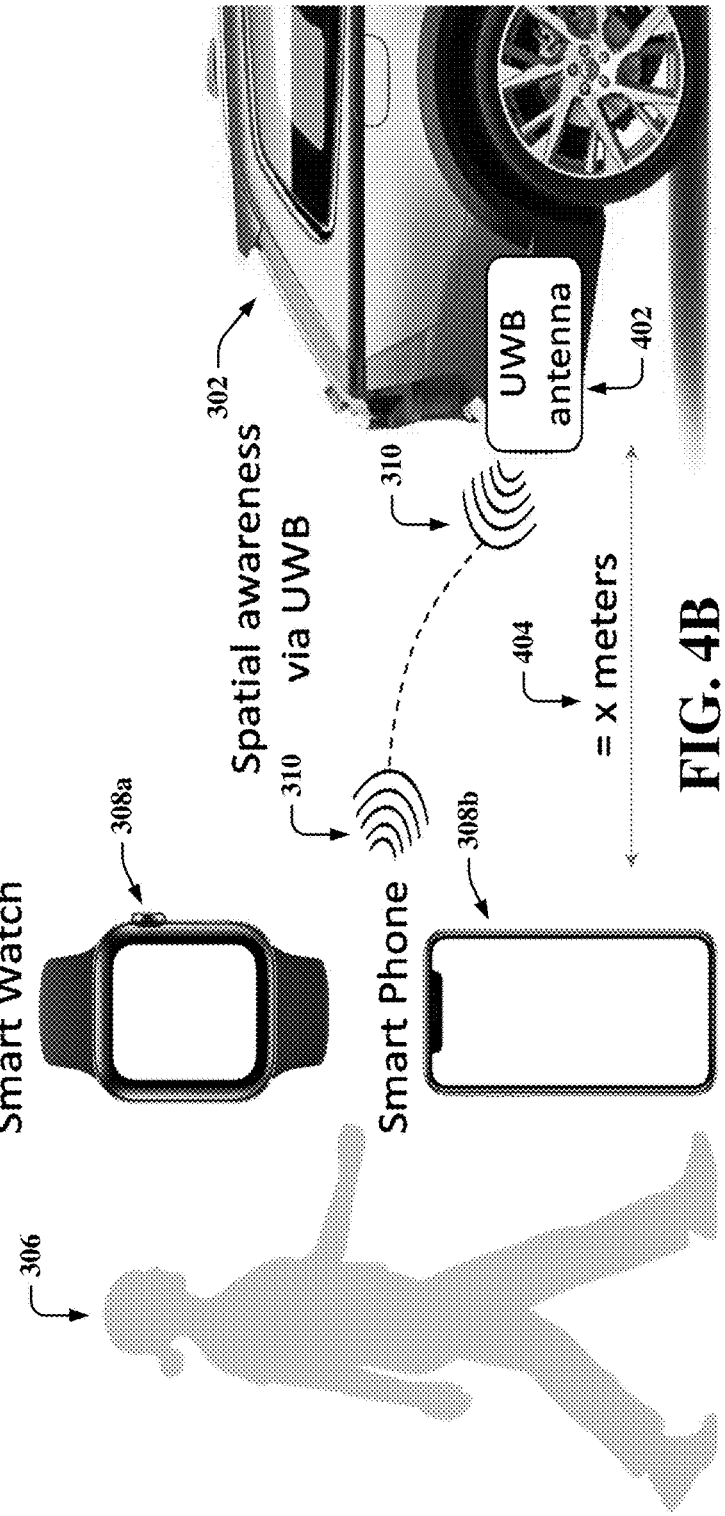

FIG. 4A illustrates a top view of an example, non-limiting system 400 that can facilitate context based interaction between a vehicle and an entity device in accordance with one or more embodiments described herein. FIG. 4B illustrates a side view of the example, non-limiting system 400. Repetitive description of like elements and/or processes employed in respective embodiments is omitted for sake of brevity.

System 400 can comprise an example, non-limiting alternative embodiment of system 300 described above with reference to FIG. 3, where vehicle 302 of system 400 can comprise an ultra-wideband (UWB) antenna 402 (referred to herein as "UWB antenna 402"). System 400 can further comprise a defined radius 404 (denoted as "x meters" in FIGS. 4A and 4B) that can extend from a certain location on vehicle 302 such as, for instance, from a rear bumper of vehicle 302 as depicted in FIGS. 4A and 4B. Defined radius 404 can be defined by an entity such as, for instance, entity 306 using an interface component of context based vehicle interaction system 102 as described above with reference to FIG. 1.

As illustrated in the example embodiment depicted in FIG. 4, defined radius 404 can comprise an area in which vehicle 302, entity device 308a, and/or entity device 308b can have spatial awareness of each other via network 310, UWB antenna 402, and/or UWB technology and/or communication protocol. In the example embodiment illustrated in FIGS. 4A and 4B, when context component 108 detects entity device 308a and/or entity device 308b within defined radius 404, message component 110 can send a context based message comprising, for instance, a push message to entity device 308a and/or entity device 308b as described above with reference to FIGS. 1 and 2.

Figure 5:
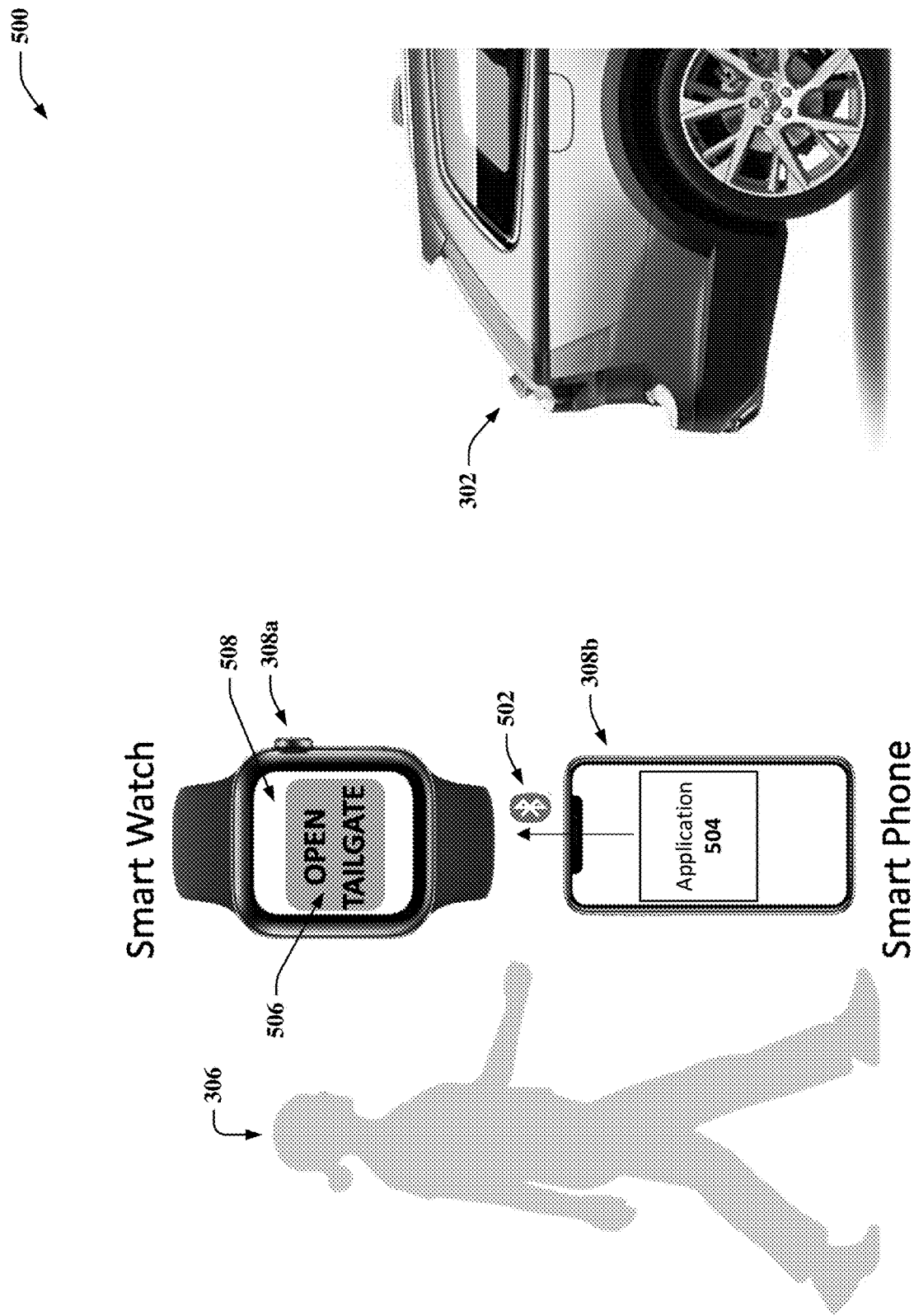

FIG. 5 illustrates a diagram of an example, non-limiting system 500 that can facilitate context based interaction between a vehicle and an entity device in accordance with one or more embodiments described herein. Repetitive description of like elements and/or processes employed in respective embodiments is omitted for sake of brevity.

System 500 can comprise an example, non-limiting alternative embodiment of system 400 described above with reference to FIGS. 4A and 4B. Entity device 308a and entity device 308b of system 500 can be communicatively coupled to each other via a BLE network 502, BLE technology and/or communication protocol, and/or a BLE antenna (not illustrated in FIG. 5) on each of entity device 308a and entity device 308b. In the example embodiment depicted in FIG. 5, entity device 308a and/or entity device 308b can comprise an application 504 that can comprise a software application associated with and/or coupled (e.g., communicatively, operatively, etc.) to context based vehicle interaction system 102. Application 504 can be installed on entity device 308a and/or entity device 308b to facilitate one or more functions of context based vehicle interaction system 102 described above with reference to FIGS. 1, 2, 3, and 4 (e.g., to facilitate identifying context conditions, sending context based messages, initiating an operation associated with vehicle 302, etc.).

With reference to the example embodiment described above and illustrated in FIGS. 4A and 4B, when context component 108 detects entity device 308*a* and/or entity device 308*b* within defined radius 404, message component 110 can send a context based message 506 to entity device 308*a* and/or entity device 308*b* as described above with reference to FIG. 1. For instance, as illustrated in the example embodiment depicted in FIG. 5, when context component 108 detects entity device 308*a* and/or entity device 308*b* within defined radius 404 (not illustrated in FIG. 5), message component 110 can send (e.g., via network 310) context based message 506 comprising the text "Open Tailgate" to entity device 308*b* and/or to application 504 on entity device 308*b*. In this example embodiment, as depicted in FIG. 5, upon receipt of context based message 506, entity device 308*b* can send (e.g., via BLE network 502) context based message 506 to entity device 308*a* and/or to application 504 on entity device 308*a*. In this example embodiment, upon receipt of context based message 506, entity device 308*a* can render context based message 506 on a screen 508 of entity device 308*a*.

In some embodiments, upon receipt of context based message 506, entity device 308*a* can render context based message 506 on screen 508 of entity device 308*a* such that context based message 506 is the only visible object on screen 508 (e.g., where context based message 506 covers and/or hides from view of entity 306 all text, numbers, and/or other visual objects previously displayed on screen 508). In some embodiments, upon receipt of context based message 506, entity device 308*a* can render context based message 506 on screen 508 of entity device 308*a* such that context based message 506 is the only visible object on screen 508 until: a) entity 306 inputs an instruction into entity device 308*a* and/or entity device 308*b* in response to context based message 506 (e.g., until entity 306 selects context based message 506 to initiate such an operation by control component 112 as described above with reference to FIG. 1); b) a defined amount of time passes (e.g., 1 minute, 5 minutes, etc.) without entity 306 inputting such an instruction to entity device 308*a* and/or entity device 308*b*, which can constitute an omission of an input instruction by entity 306 with respect to context based message 506 (e.g., entity 306 ignores context based message 506, entity 306 dismisses context based message 506, etc.); or c) entity device 308*a* and/or entity device 308*b* move (e.g., via entity 306) outside defined radius 404 (e.g., where context component 108 detects such movement of entity device 308*a* and/or entity device 308*b* outside of defined radius 404).

Figure 6:
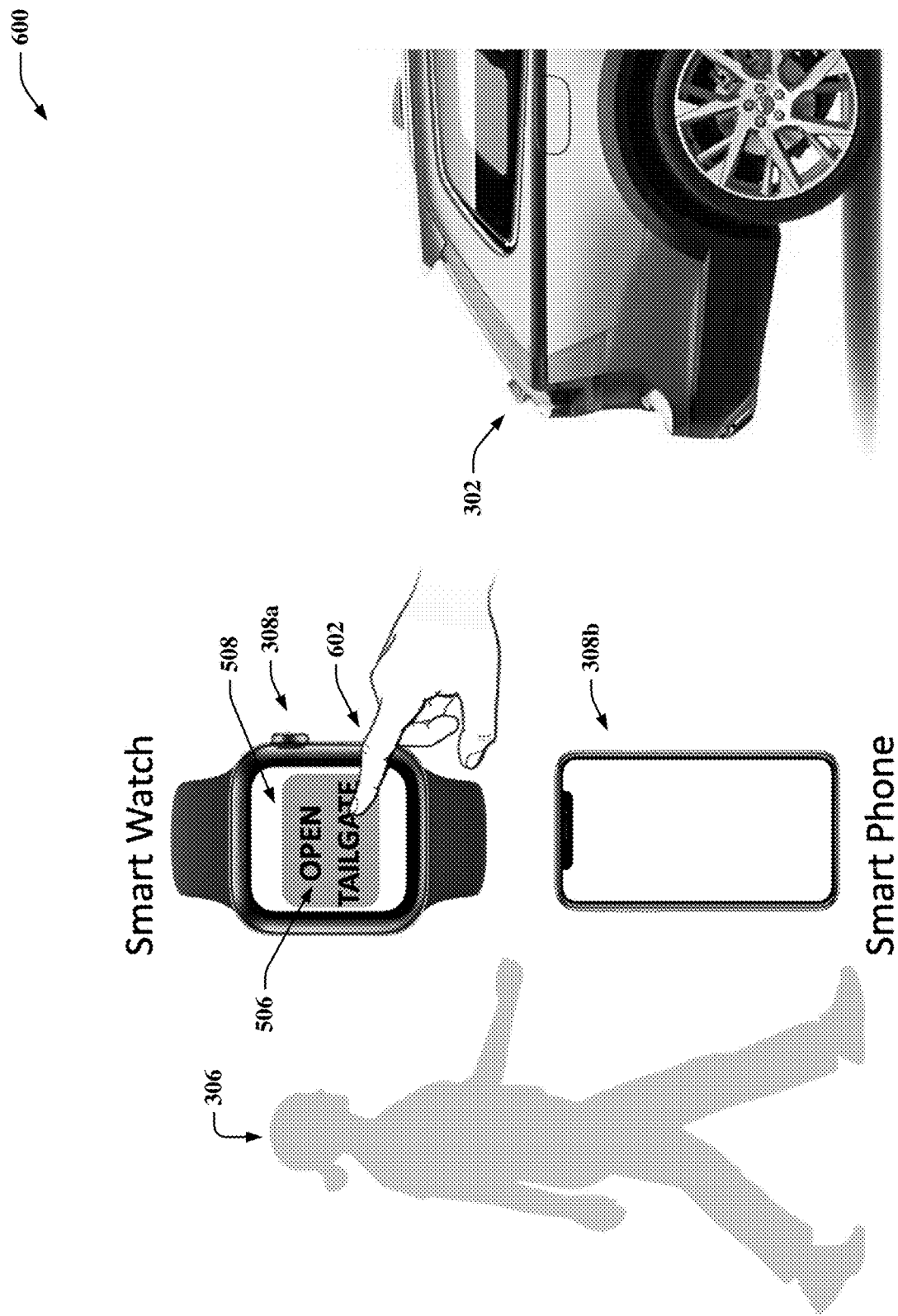

FIG. 6 illustrates a diagram of an example, non-limiting system 600 that can facilitate context based interaction between a vehicle and an entity device in accordance with one or more embodiments described herein. Repetitive description of like elements and/or processes employed in respective embodiments is omitted for sake of brevity.

System 600 can comprise an example, non-limiting alternative embodiment of system 500 described above with reference to FIG. 5. In the example embodiment depicted in FIG. 6, context based message 506 can comprise an interactive message such as, for instance, an interactive GUI object having the text "Open Tailgate" that can be rendered on screen 508 of entity device 308*a*. In this example embodiment, entity 306 can select such an interactive, context based message 506 to initiate an "Open Tailgate" operation (e.g., via control component 112 as described above with reference to FIG. 1). For example, with reference to the example embodiment described above and illustrated in FIG. 5, based on receipt of context based message 506 by entity device 308*a*, where context based message 506 comprises an interactive message, entity 306 can select context based message 506 using, for instance, a finger 602 of entity 306 as depicted in FIG. 6. In this example, such a selection of context based message 506 by entity 306 can constitute an instruction input to entity device 308*a* in response to context based message 506 that can initiate an "Open Tailgate" operation via control component 112 as described above with reference to FIG. 1.

Figure 7:
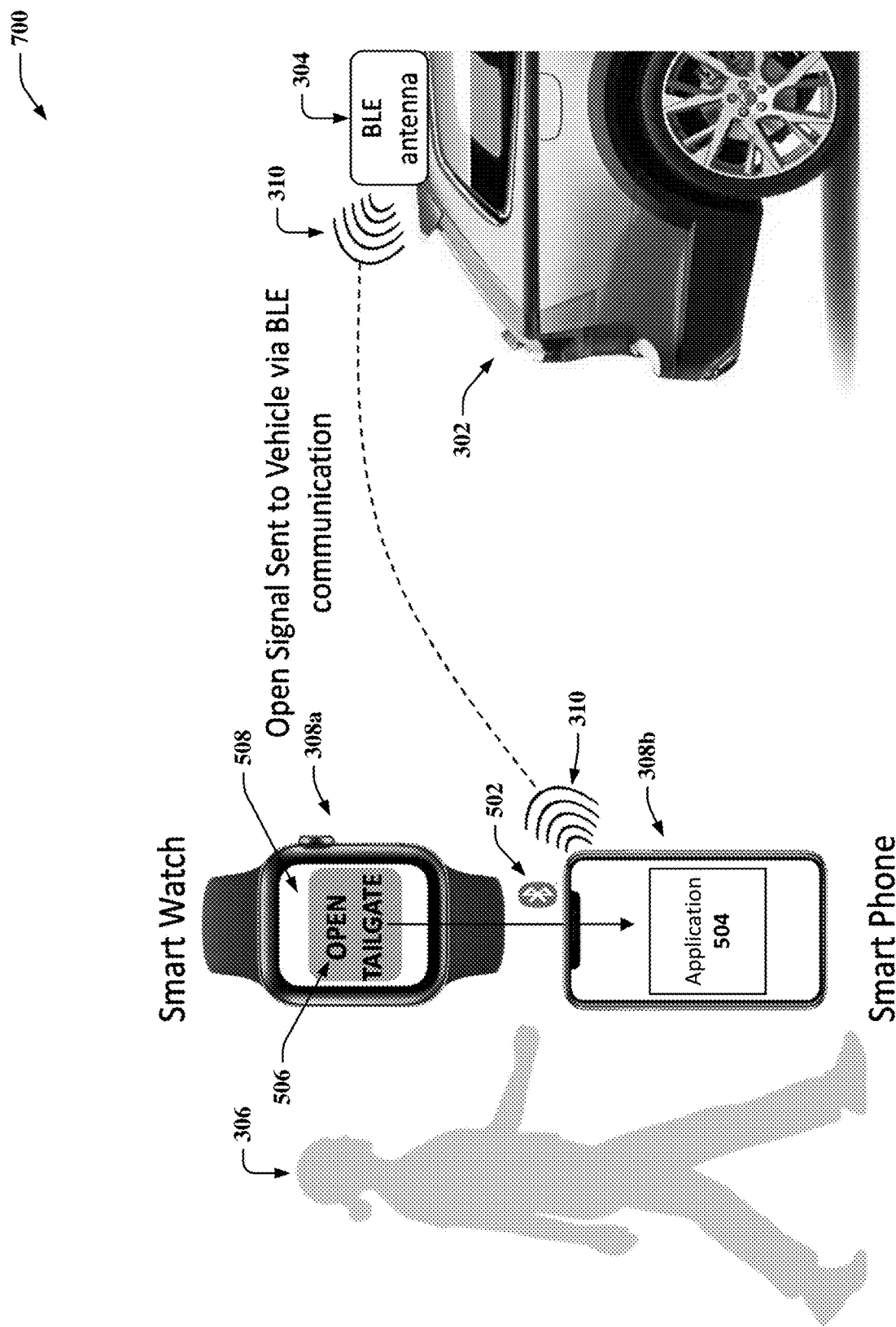

FIG. 7 illustrates a diagram of an example, non-limiting system 700 that can facilitate context based interaction between a vehicle and an entity device in accordance with one or more embodiments described herein. Repetitive description of like elements and/or processes employed in respective embodiments is omitted for sake of brevity.

System 700 can comprise an example, non-limiting alternative embodiment of system 600 described above with reference to FIG. 6. As illustrated in the example embodiment depicted in FIG. 7 and with reference to the example embodiment described above and illustrated in FIG. 6, based on the selection of context based message 506 by entity 306, where context based message 506 comprises an interactive message and such selection constitutes an instruction to "Open Tailgate" that is input to entity device 308*a* by entity 306 in response to context based message 506, entity device 308*a* can send such an input instruction to entity device 308*b* (e.g., via BLE network 502) and/or to application 504 on entity device 308*b*. In this example embodiment, based on receipt by entity device 308*b* and/or application 504 of such an input instruction to "Open Tailgate," entity device 308*b* can send such an input instruction (e.g., via network 310, etc.) to vehicle 302 and/or control component 112 to initiate an "Open Tailgate" operation on vehicle 302 (e.g., as described above with reference to FIG. 1).

Figure 8:
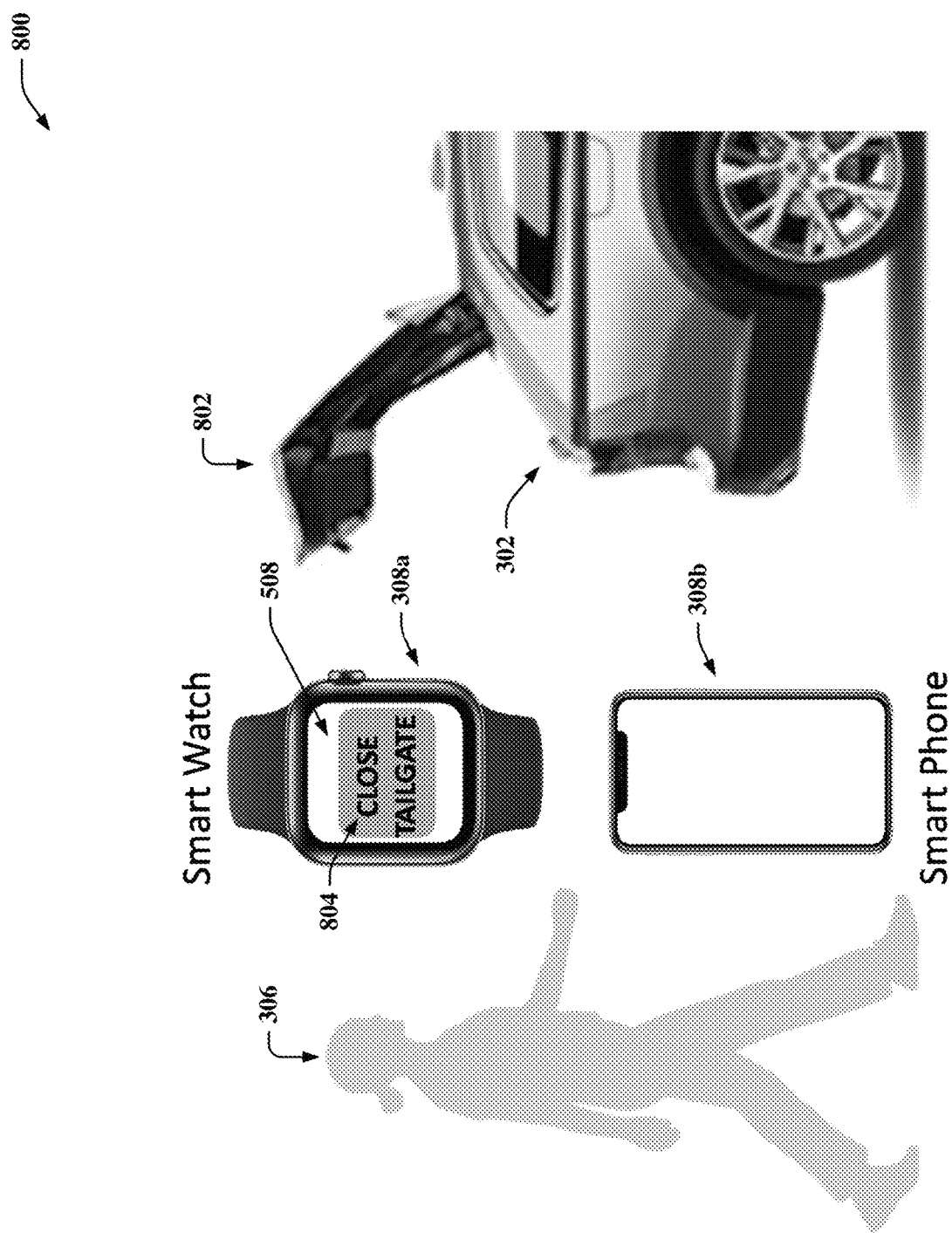

FIG. 8 illustrates a diagram of an example, non-limiting system 800 that can facilitate context based interaction between a vehicle and an entity device in accordance with one or more embodiments described herein. Repetitive description of like elements and/or processes employed in respective embodiments is omitted for sake of brevity.

System 800 can comprise an example, non-limiting alternative embodiment of system 700 described above with reference to FIG. 7. As illustrated in the example embodiment depicted in FIG. 8, vehicle 302 can comprise a tailgate 802. In various embodiments, context component 108 can detect that tailgate 802 is open, where tailgate 802 has been opened, for example: manually by entity 306; as a result of entity 306 inputting to entity device 308*a* and/or entity device 308*b* an instruction to "Open Tailgate" as described above with reference to FIG. 7; or by another operation or entity. In the example embodiment illustrated in FIG. 8, context component 108 can detect that tailgate 802 is open and message component 110 can send a context based message 804 to entity device 308*a* and/or entity device 308*b* as described above with reference to FIGS. 1 and 5. For instance, when context component 108 detects tailgate 802 is open, message component 110 can send (e.g., via network 310, BLE network 502, etc.) context based message 804 comprising the text "Close Tailgate" to entity device 308*a* and/or entity device 308*b* as described above with reference to FIGS. 1 and 5, where context based message 804 can then be rendered on a screen (e.g., screen 508) of entity device 308*a* and/or entity device 308*b*. In embodiments where context based message 804 comprises an interactive message (e.g., an interactive GUI object having the text "Close Tailgate"), entity 306 can select such an interactive context based message 804 as described above with reference to FIGS. 1, 6, and 7, where such selection can constitute an instruction that can be input by entity 306 into entity device 308a and/or entity device 308b in response to context based message 804. In these embodiments, based on such selection of context based message 804 by entity 306, entity device 308a and/or entity device 308b can send such a "Close Tailgate" instruction (e.g., via network 310, BLE network 502, etc.) to vehicle 302 and/or control component 112 as described above with reference to FIGS. 1 and 7. In these embodiments, based on receipt of such a "Close Tailgate" instruction, control component 112 can initiate a "Close Tailgate" operation on vehicle 302 (e.g., as described above with reference to FIGS. 1 and 7).

Figure 9:
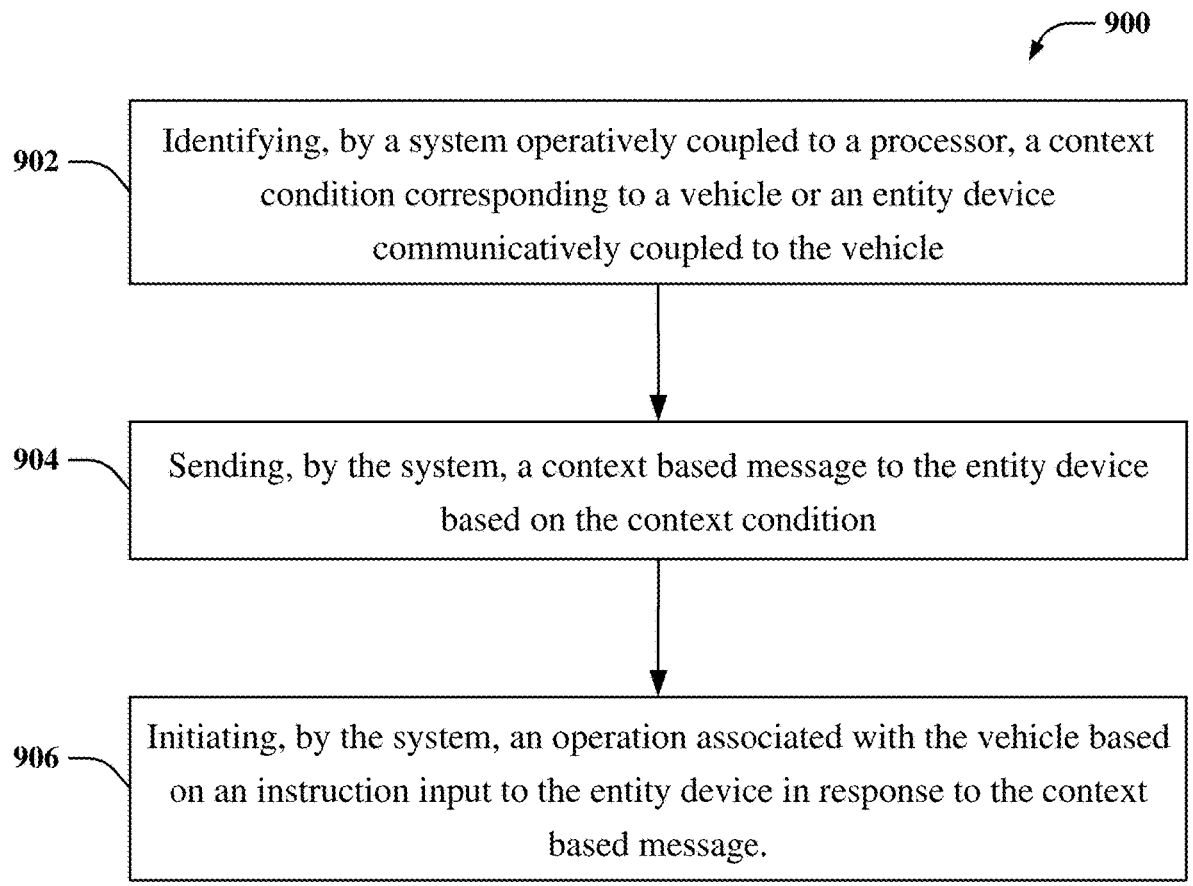
FIG. 9 illustrates a flow diagram of an example, non-limiting computer-implemented method that can facilitate context based interaction between a vehicle and an entity device in accordance with one or more embodiments described herein.

FIG. 9 illustrates a flow diagram of an example, non-limiting computer-implemented method 900 that can facilitate context based interaction between a vehicle and an entity device in accordance with one or more embodiments described herein. Repetitive description of like elements and/or processes employed in respective embodiments is omitted for sake of brevity.

At 902, computer-implemented method 900 can comprise identifying, by a system (e.g., via context based vehicle interaction system 102 and/or context component 108) operatively coupled to a processor (e.g., processor 106), a context condition (e.g., one or more context conditions defined above with reference to FIG. 1) corresponding to a vehicle (e.g., vehicle 302) or an entity device (e.g., entity device 308a, entity device 308b, etc.) communicatively coupled to the vehicle (e.g., via network 310, BLE network 502, etc.).

At 904, computer-implemented method 900 can comprise sending, by the system (e.g., via context based vehicle interaction system 102 and/or message component 110), a context based message (e.g., context based message 506, context based message 804, etc.) to the entity device based on the context condition.

At 906, computer-implemented method 900 can comprise initiating, by the system (e.g., via context based vehicle interaction system 102 and/or control component 112), an operation associated with the vehicle (e.g., an "Open Tailgate" operation, a "Close Tailgate" operation, etc.) based on an instruction input to the entity device in response to the context based message (e.g., based on selection of context based message 506 or context based message 804 by entity 306 as described above with reference to FIGS. 5, 6, 7, and 8).

It should be appreciated that the various embodiments of the subject disclosure described herein can provide improved experience of an entity as defined herein that can be associated with a vehicle and/or one or more entity devices as defined herein. For example, the various embodiments of the subject disclosure described herein can provide improved experience of an operator and/or a user (e.g., a driver, passenger, etc.) of such a vehicle defined herein. For instance, the various embodiments of the subject disclosure described herein can provide improved experience of such an operator and/or a user in executing one or more powered systems of such a vehicle defined herein (e.g., an engine, motor, transmission, door, lid, lock, window, tailgate, boot lid, hood, sunroof, HVAC system, entertainment system, navigational system, etc.). In this example, the various embodiments of the subject disclosure described herein can provide improved experience of such an operator and/or a user by providing context based interaction between such a vehicle and/or entity device defined herein that can be associated with such an operator and/or user of the vehicle. In this example, such context based interaction can provide improved experience of such an operator and/or user in executing the above described one or more powered systems of such a vehicle defined herein.

The one or more embodiments of the present invention may be a system, device, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Various aspects of the present invention are described herein with reference to flowchart illustrations and/or block diagrams of methods, apparatus (systems or devices), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems or devices, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. It will also be noted that each block of the block diagrams and/or flowchart illustration, and combinations of blocks in the block diagrams and/or flowchart illustration, can be implemented by special purpose hardware-based systems or devices that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "module," "component," "system," "device," "platform," "interface," and the like, can refer to and/or can include a computer-related entity or an entity related to an operational machine with one or more specific functionalities. The entities disclosed herein can be either hardware, a combination of hardware and software, software, or software in execution. For example, a module can be, but is not limited to being, a process running on a processor, a processor, an object, an executable, a thread of execution, a program, and/or a computer. By way of illustration, both an application running on a server and the server can be a module. One or more modules can reside within a process and/or thread of execution and a module can be localized on one computer and/or distributed between two or more computers. In another example, respective modules can execute from various computer readable media having various data structures stored thereon. The modules can communicate via local and/or remote processes such as in accordance with a signal having one or more data packets (e.g., data from one module interacting with another module in a local system, distributed system, and/or across a network such as the Internet with other systems via the signal). As another example, a module can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a module can be an apparatus that provides specific functionality through electronic modules without mechanical parts, wherein the electronic modules can include a processor or other means to execute software or firmware that confers at least in part the functionality of the electronic modules. In an aspect, a module can emulate an electronic module via a virtual machine, e.g., within a cloud computing system.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware modules, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage module relevant to operation and functionality of a module are utilized to refer to "memory modules," entities embodied in a "memory," or modules comprising a memory. It is to be appreciated that memory and/or memory modules described herein can be either volatile memory or nonvolatile memory, or can include both volatile and nonvolatile memory. Additionally, the disclosed memory modules of systems or devices or computer-implemented methods herein are intended to include, without being limited to including, these and any other suitable types of memory.

What has been described above include mere examples of systems or devices and computer-implemented methods. It is, of course, not possible to describe every conceivable combination of modules or computer-implemented methods for purposes of describing one or more embodiments, but one of ordinary skill in the art can recognize that many further combinations and permutations of these embodiments are possible. The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The terminology used herein was chosen to best explain the principles of the embodiments, the practical application or technical improvement over technologies found in the marketplace, or to enable others of ordinary skill in the art to understand the embodiments disclosed herein. In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What is claimed is:

1. A system, comprising:
   a memory that stores computer executable components; and
   a processor that executes the computer executable components stored in the memory, wherein the computer executable components comprise:
   a context component that identifies a context condition corresponding to a vehicle or an entity device communicatively coupled to the vehicle;
   a message component that sends a context based message to the entity device based on the context condition; and
   a control component that initiates, using artificial intelligence, an operation associated with the vehicle based on a defined level of confidence determined based on an instruction input to the entity device in response to the context based message or omissions of instructions input to the entity device in response to the context based message.

2. The system of claim 1, wherein at least one of the context condition, the vehicle, the entity device, the context based message, the operation, or the instruction is defined by an entity.

3. The system of claim 1, wherein the context condition is selected from a group consisting of a locked vehicle component, an unlocked vehicle component, an open vehicle component, a closed vehicle component, a powered on vehicle component, a powered off vehicle component, the entity device is within a defined proximity of the vehicle, the entity device is outside a defined proximity of the vehicle, and at least one of the vehicle or the entity device is located at a defined location.

4. The system of claim 1, wherein the context based message is selected from a group consisting of a push message, a passive message, an interactive message, a textual message, a numerical message, an alphanumeric message, an audio message, a video message, and a pictogram message.

5. The system of claim 1, wherein the instruction is selected from a group consisting of an active instruction to initiate the operation, a passive instruction to initiate the operation, a textual instruction, a numerical instruction, an alphanumeric instruction, an audio instruction, a video instruction, a pictogram instruction, and a defined instruction corresponding to a defined motion of the entity device.

6. The system of claim 1, wherein the computer executable components further comprise:
   an artificial intelligence component that learns to perform at least one of:
   identifying one or more context conditions corresponding to the vehicle or the entity device;
   sending one or more context based messages to the entity device based on the one or more context conditions; or
   initiating one or more operations associated with the vehicle based on at least one of instructions input to the entity device in response to the one or more context based messages or omissions of instructions input to the entity device in response to the one or more context based messages.

7. A computer-implemented method, comprising:
   identifying, by a system operatively coupled to a processor, a context condition corresponding to a vehicle or an entity device communicatively coupled to the vehicle;
   sending, by the system, a context based message to the entity device based on the context condition; and
   initiating, by the system, using artificial intelligence, an operation associated with the vehicle based on a defined level of confidence determined based on an instruction input to the entity device in response to the context based message or omissions of instructions input to the entity device in response to the context based message.

8. The computer-implemented method of claim 7, wherein at least one of the context condition, the vehicle, the entity device, the context based message, the operation, or the instruction is defined by an entity.

9. The computer-implemented method of claim 7, wherein the context condition is selected from a group consisting of a locked vehicle component, an unlocked vehicle component, an open vehicle component, a closed vehicle component, a powered on vehicle component, a powered off vehicle component, the entity device is within a defined proximity of the vehicle, the entity device is outside a defined proximity of the vehicle, and at least one of the vehicle or the entity device is located at a defined location.

10. The computer-implemented method of claim 7, wherein the context based message is selected from a group consisting of a push message, a passive message, an interactive message, a textual message, a numerical message, an alphanumeric message, an audio message, a video message, and a pictogram message.

11. The computer-implemented method of claim 7, wherein the instruction is selected from a group consisting of an active instruction to initiate the operation, a passive instruction to initiate the operation, a textual instruction, a numerical instruction, an alphanumeric instruction, an audio instruction, a video instruction, a pictogram instruction, and a defined instruction corresponding to a defined motion of the entity device.

12. The computer-implemented method of claim 7, further comprising at least one of:
learning, by the system, to identify one or more context conditions corresponding to the vehicle or the entity device;
learning, by the system, to send one or more context based messages to the entity device based on the one or more context conditions; or
learning, by the system, to initiate one or more operations associated with the vehicle based on at least one of instructions input to the entity device in response to the one or more context based messages or omissions of instructions input to the entity device in response to the one or more context based messages.

13. A non-transitory computer readable medium having program instructions embodied therewith, the program instructions executable by a processor to cause the processor to:
identify, by the processor, a context condition corresponding to a vehicle or an entity device communicatively coupled to the vehicle;
send, by the processor, a context based message to the entity device based on the context condition; and
initiate, by the processor, using artificial intelligence, an operation associated with the vehicle based on a defined level of confidence determined based on an instruction input to the entity device in response to the context based message or omissions of instructions input to the entity device in response to the context based message.

14. The non-transitory computer readable medium of claim 13, wherein at least one of the context condition, the vehicle, the entity device, the context based message, the operation, or the instruction is defined by an entity.

15. The non-transitory computer readable medium of claim 13, wherein the context condition is selected from a group consisting of a locked vehicle component, an unlocked vehicle component, an open vehicle component, a closed vehicle component, a powered on vehicle component, a powered off vehicle component, the entity device is within a defined proximity of the vehicle, the entity device is outside a defined proximity of the vehicle, and at least one of the vehicle or the entity device is located at a defined location.

16. The non-transitory computer readable medium of claim 13, wherein the context based message is selected from a group consisting of a push message, a passive message, an interactive message, a textual message, a numerical message, an alphanumeric message, an audio message, a video message, and a pictogram message.

17. The non-transitory computer readable medium of claim 13, wherein the instruction is selected from a group consisting of an active instruction to initiate the operation, a passive instruction to initiate the operation, a textual instruction, a numerical instruction, an alphanumeric instruction, an audio instruction, a video instruction, a pictogram instruction, and a defined instruction corresponding to a defined motion of the entity device.

18. The non-transitory computer readable medium of claim 13, wherein the program instructions are further executable by the processor to cause the processor to:
learn, by the processor, to identify one or more context conditions corresponding to the vehicle or the entity device;
learn, by the processor, to send one or more context based messages to the entity device based on the one or more context conditions; and
learn, by the processor, to initiate one or more operations associated with the vehicle based on at least one of instructions input to the entity device in response to the one or more context based messages or omissions of instructions input to the entity device in response to the one or more context based messages.

19. The system of claim 1, wherein the entity device comprises a mobile phone.

20. The system of claim 1, wherein the entity device comprises a wearable device.

* * * * *